March 3, 1964 A. R. HEWITT ETAL 3,123,195

WEB FEEDING CONTROL MEANS IN BUSINESS MACHINES

Filed Sept. 13, 1960 2 Sheets-Sheet 1

INVENTORS
ALAN ROBERT HEWITT
ROGER ARTHUR DAVIS
BY Kane and Nydick
ATTORNEYS

WEB FEEDING CONTROL MEANS IN BUSINESS MACHINES

Filed Sept. 13, 1960 2 Sheets-Sheet 2

INVENTORS
ALAN ROBERT HEWITT
ROGER ARTHUR DAVIS
BY Hane and Nydick
ATTORNEYS

United States Patent Office 3,123,195
Patented Mar. 3, 1964

3,123,195

WEB FEEDING CONTROL MEANS IN BUSINESS MACHINES

Alan Robert Hewitt and Roger Arthur Davis, Letchworth, England, assignors to International Computers and Tabulators Limited, London, England Filed Sept. 13, 1960, Ser. No. 55,658
Claims priority, application Great Britain Sept. 17, 1959
14 Claims. (Cl. 197—133)

Figure 1:
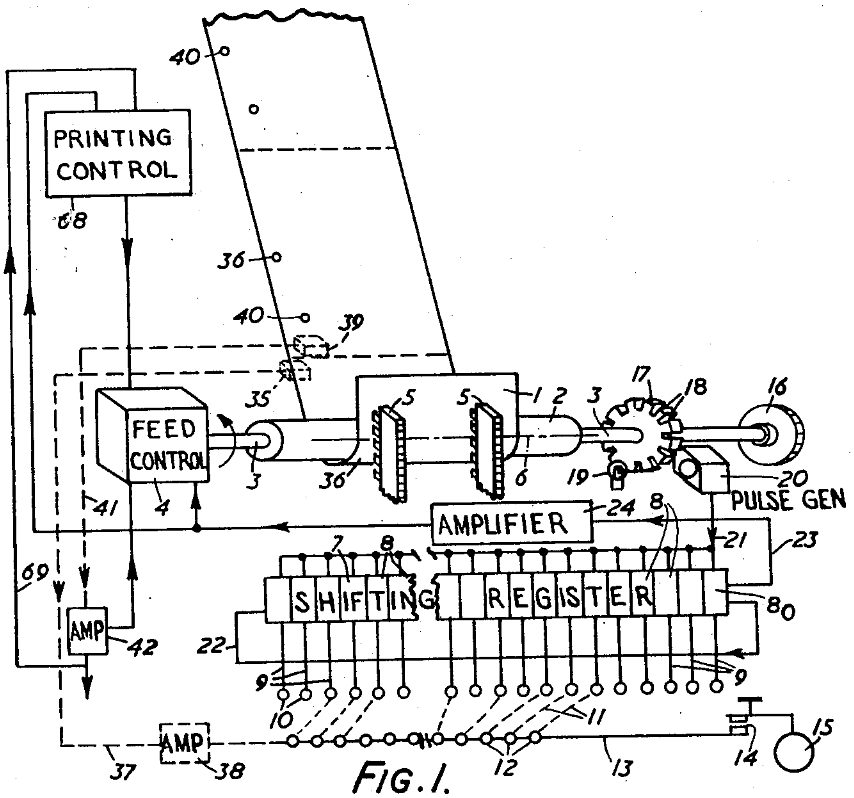

The present invention relates to document feeding and positioning apparatus particularly, but not exclusively, for use in printing devices.

In known apparatus documents are fed and positioned for printing under control of perforations in an endless paper tape. The tape is moved past a sensing arrangement in synchronism with the feeding of each sheet through a printer arranged to print a single line of characters. The sensing of a perforation in the tape is arranged to arrest the feeding of the document so that a line of characters may be printed in the correct position on the document. The documents to be printed may be of several different kinds, for example, they may be invoices or statistical lists. Such documents are commonly pre-printed with headings and predetermined areas may be provided in which indicative information such as an address or date is required to be printed. Since the pre-printing and general layout of the printing required may be different for each of various documents required to be printed, it follows that a separate paper tape is usually required for each of the kinds. Moreover paper tapes are susceptible to mechanical damage, for example, by accidental tearing during handling or to wear during use.

It is an object of the present invention to provide apparatus for feeding and positioning a document in which the disadvantages of paper tape outlined in the preceding paragraph are avoided by the use of an electrical control arrangement.

According to one aspect of the present invention document feeding and positioning apparatus including means for feeding documents past a datum position, a shifting register having a plurality of stages, means for entering a pattern of arresting signals into the stages of the register, the pattern of arresting signals corresponding to those positions on at least a part of the document, which are required to be brought to rest at the datum position by the arresting of the feeding means, means for shifting the arresting signals along the registers in synchronism with the feeding of a document, means for selecting the register to be read out when the corresponding part of the document is passing the datum position, means for reading out the arresting signals from one stage of the selected register and means for arresting the feeding means in response to the reading out of the arresting signals.

According to another aspect of the invention apparatus is provided for printing lines of characters in predetermined positions on a document including means for feeding the document past a datum position, means operable to print a line of characters at the datum position, one or more shifting registers each having a plurality of stages, means for entering a pattern of arresting signals into the stages, means for entering a pattern of arresting signals into the stages of the or each shifting register, the pattern corresponding to the positions on the document in which lines of characters are required to be printed, means for selecting the or a register to be read out, means for shifting the arresting signals along the or each register, means for reading out the arresting signals from one stage of the selected register, means for arresting the feeding means in response to the reading out of an arresting signal, means for operating the printing means and means for restarting the feeding means after the printing of a line of characters.

In a further mode of operation, two or more registers may each contain a pattern of arresting signals associated with separate part of the sheet and the register selecting means then includes means for inhibiting reading out signals from a register except when the associated part of the document is passing the datum position. In yet another mode of operation, a register contains one or more format signals corresponding to a position or positions on alternative kinds of document and in which the selecting means is adapted to permit or inhibit the reading out of signals to cause arresting of the feeding means in dependence upon the reading out of a format signal during the feeding of one of the said alternative kinds of document.

A or each shifting register may be connected end to end to form a recirculating register so that a single pattern of arresting signals may be repeatedly recirculated in such a manner that the arresting signals occupy the same stages of the register at the beginning of feeding of each document. Alternatively, the or each register may be arranged so that signals read out are not re-entered, said arresting signal entering means being arranged to re-enter the pattern for each document. The arresting signal entering means may then include means for sensing a representation carried by the document and means responsive to the sensing of the representation to enter the pattern of arresting signals into the register.

It will be appreciated that this last-mentioned method of entry of the arresting signals into a register may only be used in conjunction with sheets carrying a representation in a predetermined position.

Figure 2:
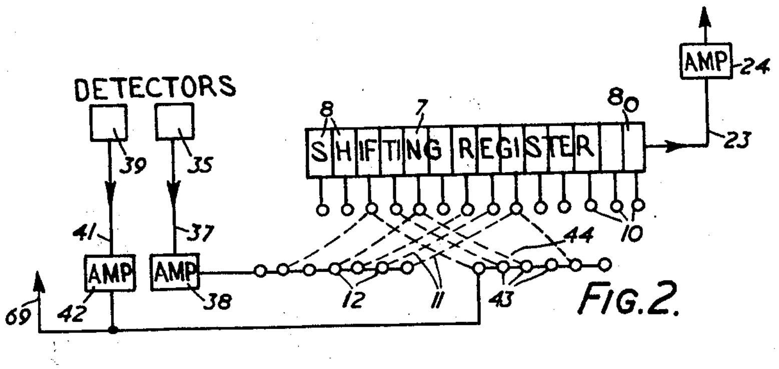
Figures 3, 4:
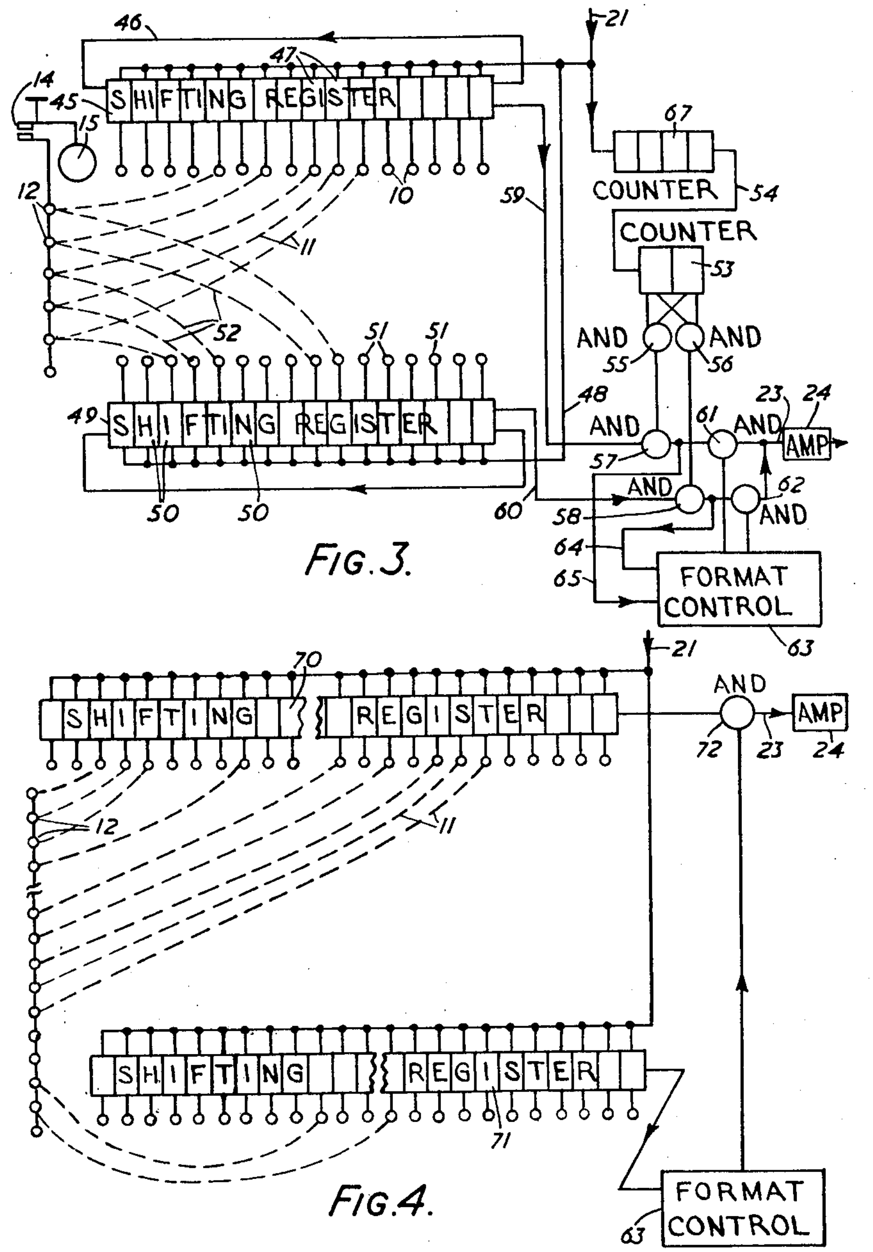

Apparatus embodying the invention will now be described, by way of example, with reference to the accompanying drawings, in which, FIGURE 1 is a schematic representation of document feeding and positioning apparatus, FIGURE 2 is a schematic diagram of a shifting register forming part of an alternative apparatus for feeding and positioning a document, FIGURE 3 is a schematic representation of part of a further document feeding and positioning apparatus, and FIGURE 4 is a schematic representation of yet another document feeding and positioning arrangement.

FIGURE 1 shows part of a printing unit employing an example of document feeding and positioning apparatus according to the invention, the latter operating to control the feeding and positioning of a document in order to allow printing to be effected in a number of predetermined line positions.

In this printing unit a document 1 is fed by means of a platen 2 and is presented to a number of type-carrying printing heads 5, of which two only are shown for clarity. The printing heads are adapted to print selected characters along a single line on the document 1, represented diagrammatically in FIGURE 1 by a line 6. The selection of characters to be printed may be performed in any conventional manner using any suitable kind of printing head.

The platen 2 is rotated to feed the document 1 by shaft 3, to which it is secured, and the shaft 3 is driven by means of a control mechanism 4. A known form of control mechanism for this purpose includes a constantly running electric motor coupled by means of a clutch to the shaft 3. The clutch includes a notched disc and a pawl engageable with successive notches to locate the shaft 3, and hence the platen, in successive printing line positions. Withdrawal of the pawl allows the shaft 3 to be driven by the motor. The pawl is withdrawn and replaced by means of solenoid controlled mechanical linkages and arrangements are made in conjunction with a printing control device 68 to provide an electrical impulse at the conclusion of a printing operation for the energization of the pawl withdrawal solenoid. Thus, in order to arrest the document in a printing position it is only required to provide an electrical impulse to energize the pawl replacement solenoid at a time when the required printing line on the document is approaching the datum position represented by the line 6. In the following description, it will be assumed that this particular form of control mechanism is employed but it will be appreciated that other suitable mechanisms may replace it.

In order to generate the required arresting impulses a shifting register 7 is provided having a number of bistable stages 8. The number of stages provided is equal to the number of possible positions on the document 1 in which a line of characters may be printed. These printing positions will be referred to as line positions.

Each stage 8 of the shifting register has two stable states which will be referred to as the unset state and the set state respectively. All stages 8 are normally in the unset state.

Each stage 8 is connected by means of a line 9 to a socket 10, the connection to the stage 8 being such that a signal of predetermined electrical potential applied to a line 9 causes the associated stage 8 to switch to the set state.

Pluggable connections 11 are provided between preselected ones of the sockets 10 and a row of common sockets 12. The common sockets 12 are connected by a line 13 to manually operated contacts 14 which are normally open. The contacts 14 are also connected to a source 15 of the required potential.

Thus, if the contacts 14 are closed, those stages 8 which have been selected by the pluggable connections 11 will be switched to the set state. For example, in order to perform this preselection, suppose that the document required to be printed is an invoice having a pre-printed heading. It is required to print three lines with a name and address and these lines are to be spaced by five line positions from the top of the document. Thereafter a line position is to be left unprinted and a date is to be printed on the next following line position. A further line position is then to be left unprinted and from the next line position onwards is to be printed a list of commodities to which the invoice relates. The foregoing requirements may be summarised as requiring that the document is positioned for printing at the 6th, 7th, 8th, 10th and then the 12th and successive line positions.

Accordingly, pluggable connections 11 are provided between the common sockets 12 and the sockets 10 associated with the 6th, 7th, 8th, 10th, 12th and subsequent stages 8 of the register 7, the stages 8 being counted from the right-hand end of the register 7 as shown in FIGURE 1.

Having set up the necessary pluggable connections a document 1 is now introduced into the platen 2 and is advanced until the top edge is at the position represented by the datum line 6. This preliminary movement of the document 1 is obtained by turning the platen 2 manually by means of a handwheel 16 secured in the conventional manner to the shaft 3. At this point, the contacts 14 are closed manually and the pre-selected stages 8 of the register 7 are set so that the register 7 now carries, by virtue of the set stages, a pattern of arresting signals corresponding to the line positions in which the document 1 is required to be positioned for printing.

The automatic feeding of the document 1 is now started by engaging the clutch within the control mechanism 4 by the manual operation of a start control key (not shown) and the drive transmitted through the shaft 3 rotates the platen 2 to feed the document 1.

Secured to the shaft 3 is a disc 17. Slots or apertures 18 are formed in the periphery of the disc, and these apertures 18 are scanned photoelectrically. A source of illumination 19 is arranged on one side of the disc 17 and a photoelectric detector 20 is arranged on the opposite side. The detector 20 includes a photo-electric cell and an amplifier which together generate an electrical impulse for each aperture 18 passing the detector. The apertures 18 are so positioned in relation to the platen that shortly before each line position on the document 1 passes the datum position 6 an electrical position impulse is generated by the detector 20. These position pulses are passed over a shift-pulse supply line 21 to all the stages of the shifting register in known manner to cause the pattern of arresting signals to be shifted along the register from left to right as shown in FIGURE 1 in synchronism with the passage of the line positions on the document 1 past the datum position 6. It will be appreciated that the function of the photoelectric generator 20 is merely to produce position impulses representing line positions passing the datum line 6. Hence the pulses are generated by the sensing of representations in the form of the marks or apertures 18. It will be appreciated that other forms of pulse generator may be used for this purpose e.g. a phonic wheel generator or a waveform generator synchronised to the platen, the output waveform being shaped and amplified to provide the pulses.

An output line 23 is connected to the extreme right-hand stage 80 of the register 7 and signals from the register stage 80 are passed over the line 23 to an amplifier 24. This amplifier then selects those outputs corresponding to the entry into the stage 80 of arresting signals and passes corresponding electrical pulses to the control mechanism 4 to energize the clutch pawl replacement solenoid described earlier and so disengage the clutch.

Disengagement of the clutch then causes the platen 2 to stop and arrests the document 1 at the required printing line. The output pulse from the amplifier 24 is also passed to the printing control device 68 to initiate a printing operation. After the completion of this operation the clutch in the control mechanism 4 is automatically re-engaged, as previously described, under control of the printing control device 68.

It will be seen, therefore, that, in order to position the document at a series of line positions, a pattern of arresting signals is entered into the register 7 and these signals are shifted along the register in synchronism with the movement of the document. As an arresting signal reaches the end of the register 7 it produces an output signal which stops the sheet 1 at the related line position.

The pattern of arresting signals is preselected by means of the plug connections 11 and the arresting signals are entered into the shifting register by closure of contacts 14 while a sheet is in a predetermined position to ensure the correct relationship between the sheet and the pattern of arresting signals.

The shifting register 7 may consist of any suitable conventional arrangement having a number of stages 8, each stage being settable to either of two stable states, in which the settings of the stages are shifted in one direction along the register in response to the application of shifting pulses. Suitable registers of this kind are known and may consist, for example, of bistable electronic trigger stages or stages using bistable storage elements, such as magnetic storage cores having substantially rectangular hysteresis characteristics, for example, ferrite cores.

In cases where single documents are required to be individually printed it is usual to allow the platen 6 to revolve sufficiently to feed the printed document completely clear of the printing mechanism. Moreover, the necessity to enter a new sheet by manual rotation of the platen 2 generates shifting pulses, since the disc 17 is similarly rotated. Thus, under these circumstances, it is convenient to re-enter the pattern of arresting signals by means of the contacts 14 for every document, the previously entered signals having been shifted out of the register during printing of the previous document.

In order to avoid the necessity for feeding individual documents into the apparatus it has previously been proposed to use so-called "continuous stationary," which consists of a number of documents 1 joined end-to-end, individual documents 1 being separated by bursting after printing has taken place. Where this kind of stationary is used the register 7 may, as shown in FIGURE 1, be connected end-to-end by a path 22 to form a recirculating loop the arresting signals shifted out from the right-hand end of the register being re-entered into the left-hand end. Thus, after as many shifting pulses have been applied as there are stages 8, it will be apparent that the original pattern is again stored in the register 7. Hence, if the number of stages 8 in the register 7 is equal to the number of line positions on a sheet it will be seen that the pattern is restored to the original stages at the beginning of each new document 1. Thus the pattern of arresting signals may initially be entered into the register 7 (FIGURE 1) by means of the manual operation of contacts 14 as described. The provision of the recirculation connection 22 then ensures that the original pattern of arresting signals is repeated as each succeeding document reaches the datum position. Thus it is unnecessary to repeat the entry of signals by means of the contacts 14 for successive documents.

Alternatively, provision may be made for the automatic entry of the pre-selected pattern of arresting signals into the register 7 at the commencement of feeding of each document.

The entry of each succeeding document into the platen 2 is detected by a photo-electric detector 35, shown schematially by a dotted out-line in FIGURE 1 and positioned on the side of the platen 2 from which the documents 1 enter. An indication consisting of a mark or perforation 36 is provided near one edge of each document 1. The relative positions of the indication 36 and the photo-electric detector 35 are such that an impulse is generated by the detector 35 at the time when the top edge of the sheet reaches the datum position 6. This impulse is passed over line 37 to an amplifier 38. The output of the amplifier 38 in response to the impulse is of the correct amplitude and polarity to cause setting of the register stages 8.

This output is applied to the connectors 12 and is passed by the usual connections 11, 10 and 9 to the register stages 8 to enter the pre-selected arresting signal pattern into the register 7. In this case, of course, the contacts 14 are not required and the recirculating loop 22 of the register 7 is omitted.

These arrangements are of particular value in that, since the pattern is separately entered for each succeeding document, any cumulative misalignment due, for example, to variation in document length or to the documents slipping in relation to the platen, is avoided. Arrangements for automatic entry of the pattern of arresting signals into the register 7 may also be provided where individually printed, separate documents are used. The detector 35 may then sense either an indication 36 or may merely detect the presence of the leading edge of the document. This arrangement is of particular advantage for example, in the case of certain known kinds of printing apparatus in which it has been proposed to provide automatic insertion of a sheet into the apparatus. In such apparatus the sheet rests upon a support at one side of the platen 2 and is released by the withdrawal of the support and carried by the rotation of the platen 2 into the required first printing position.

The preceding descriptions have assumed that the register 7 is required to have as many stages 8 as there are line positions on a document. However, it is possible to effect reduction in the number of these stages 8. For example, in the case of the invoice referred to earlier as an example of a document to be printed it will be appreciated that the main body of the document consists of a list of items which are to be printed in succession at single line spacing.

The operation of spacing the document by single lines during the printing of lists of items in this main body may be carried out by an alternative mechanism provided in the control mechanism 4. For example, in known apparatus for controlling printing operations, which apparatus is, in turn, controlled by perforated record cards, in addition to the clutch referred to earlier, a separate line-spacing mechanism, consisting of a ratchet and pawl, is interposed between the clutch and the shaft 3. The pawl is mechanically oscillated in synchronism with the printing unit and is moveable into and out of engagement with the ratchet under control of a solenoid. Thus, during listing of items at single line spacing the apparatus is arranged to energise the solenoid, thereby engaging the pawl and ratchet so that the platen is mechanically spaced one line position for each printing operation. In an alternative form of construction the pawl is always engaged with the ratchet but is linked with an oscillating hook under control of an electromagnet to perform the same operation. Under these conditions, the clutch referred to earlier is used only to position the document for printing lines above and below the main body of the list. Thus, a first pattern of arresting signals is required to position the document for printing of heading material, for example the name, address and the date lines referred to, and for setting the position of the document for the first listed line. A second pattern of arresting signals may also be required to control positioning of the document for printing in an area at the foot of the document, for example, the position to be occupied by totals and possibly a further address.

Since the patterns required for controlling the document position will alternately deal with areas at the head and foot of the document, it is possible to arrange that a single register may be used for both patterns. Moreover, the register requires only sufficient stages to enable it to accommodate the larger of these two patterns. In order to identify the area at the foot of a document a further indication 40 is provided on the document 1 and a further photo-electric detector 39 is provided near the detector 35. The detector 39 co-operates with the indication 40 which is positioned on the document so that a signal is derived from the detector 39 as the required area at the foot of the document approaches the printing position. It will be appreciated that the marks 36 and 40 are placed at different distances from the edge of the document so that each is detected only by the appropriate detector 35 or 39.

The modifications of parts of FIGURE 1 for this purpose are shown in FIGURE 2 which shows the register 7, the stages 8 of which are connected to the usual sockets 10. Output pulses for arresting feeding are selected from the final stage 80, as before, by the amplifier 24. As in the case described with reference to FIGURE 1, a number of common sockets 12 are provided connected to the output of the amplifier 38. The input to the amplifier 38 is applied over the line 37 and is derived, as described previously, from the photo-electric detector 35 which senses the indication 36 associated with the arrival of the top edge of the document at the datum position 6.

Thus, the pluggable connections 11 between the common sockets 12 and the sockets 10 are arranged as before to enter into the register 7 the pattern of arresting signals required for the head area of the sheet. In the example shown, these signals are entered into the 6th, 7th, 8th, 10th and 12th stages 8 of the register 7 as required for the invoice previously referred to. The 12th stage thus corresponds to the first line position of the main body of the list. At this point the single line spacing arrangements provided in the control mechanism 4 are set into operation by the printing control device 68 (FIGURE 1) and, since all the arresting signals have now been shifted out of the register 7 (FIGURE 2), all the stages 8 are now in an unset state in readiness for the entry of further arresting signals.

As the area at the foot of the document in which positioning of the document is required approaches the printing or datum line 6, the indication 40 is detected by the detector 39 (FIGURE 1). However, the indication 40 is detected at a sufficient time before the arrival of the next following document so that the pattern of arresting signals associated with the area at the foot of the present document is shifted out of the register 7 before the pattern associated with the area at the head of the next document is required to be entered.

The output of the detector 39 is passed over line 41 (FIGURES 1 and 2) to an amplifier 42 (FIGURE 2), the output of which is connected to an additional row of common sockets 43. Pluggable connectors 44 are provided to link the common sockets 43 to selected ones of the entry sockets 10 of the register stages 8. Thus, the pattern of arresting signals required for the area at the foot of the document is entered into the register 7 in a similar manner to that for the entry of the pattern associated with the area at the head of the document and is effected on detection of the indication 40. The signal from the amplifier 42 is also applied, over line 69 as shown in FIGURE 1, to control circuitry in the printing control device 68 to render the line by line spacing arrangements ineffective.

It will be obvious that further patterns of arresting signals for other parts of the document may be entered into the register 7 at the appropriate time by providing separate detectors and marks in the appropriate relative positions. Each pattern is then associated with a particular and separate part of the document.

Since the patterns of arresting signals are each entered by a separate amplifier, such as 38, as the result of detecting an appropriate indication, it will be appreciated that this method of controlling the entry of arresting signals is particularly suitable for providing different programmes of arresting patterns for various different kinds of documents as they are entered.

For instance, considering still the example of an invoice previously used, it is commonly required to provide alternative layouts of printing on different documents. For example an invoice may require a different layout of head printing in dependence upon whether goods to which it refers are to be delivered to the same or a different address as that to which the invoice itself is sent. Such differences may be regarded as requiring different kinds of document. In the record card controlled apparatus previously considered it is possible to indicate the particular kind of document by means of a designation carried by a card. This designation may then be sensed and used to select a particular amplifier for the entry of the required pattern of arresting signals. In this case, of course, all the amplifiers concerned with head-pattern entries will include AND gates which also receive signals from the document position detectors such as 35 or 39 and only the required amplifier passes the output signal to condition the register stages. It will also be appreciated that similar control arrangements may be used to select a particular amplifier for this purpose from other controlling apparatus such as for example, an electronic computer or data processing apparatus.

It will be appreciated that in the production of printed documents such as the invoice described above provision may be required for modifying the operation of the apparatus to accommodate overflow conditions. This requirement may arise, for example, where the document capacity is determined by the number of line positions in the main body of the invoice and it is required to print a list having a greater number of items than there are line positions on a single document.

Suppose, for example, that printing is controlled by known punched record card controlled equipment and that the number of items to be listed is greater than the number of line positions in the body of the document. Under these conditions the listing of items is required to be continued on succeeding documents, with the result that each such document may again be regarded as of a different kind requiring a different layout. For example, the first document requires the usual head printing but instead of the usual printing at the foot a carried forward total only is required. The succeeding document does not require the usual heading but may carry a brought forward total in the first item position. The pattern at the foot of this document is again dependent upon whether a further continuation document is necessary, and it will be seen that the previously described foot pattern is required only on the final document.

The apparatus will then be required to operate in the following manner. The first document is positioned in accordance with the arresting pattern relating to the area at the head of the document. During this phase of operation, indicative information (e.g. name, address, date) is sensed from a leading group of record cards and is printed on the document. Items to be listed are next sensed from following record cards and as each item is sensed printing and line spacing of the document takes place. This action continues until the end of the main body of the document is reached.

At this point an arrangement in the controlling apparatus detects the fact that the listing operation is still required to continue and the required action for the production of a continuation document is initiated. Listing of items on the first document is discontinued and a subtotal is printed. The first document is then fed out of the printing apparatus and a second document enters. Since the first document held a carried-forward total it is required to feed the sheet directly to the first listing position and print the sub-totals brought forward from the first document. Listing and line spacing operations are then resumed. Finally, the foot of the last document relating to the transaction is required to be positioned in accordance with the requirements of the pattern of arresting signals relating to the area at the foot of a single document.

The apparatus may be arranged as previously described, the requisite pattern being entered into the register under control of signals derived from the controlling apparatus. An alternative arrangement may, however, be used under these circumstances, a special signal, termed a format signal, being entered into a register for the purpose.

FIGURE 3 shows an arrangement of shifting registers which may be substituted for the register 8 in the apparatus shown in FIGURE 1 in order to permit control of the positioning of continuous stationary documents under these conditions. The arrangement includes a shifting register 45 having a recirculating loop 46 and consisting of sixteen stages 47. Each stage 47 is connected to one of the sockets 10 previously referred to. The sockets 10 are linked by pluggable connections 11 to the common sockets 12, which are connected to the contacts 14 described with reference to FIGURE 1. The arrangement of the pluggable connectors 11 is such that the stages 47 of the register may be set by the closure of the contacts 14 to the arresting pattern required for the area at the head of the document. It will be appreciated, of course, that the other methods described may be used for initially entering the signal patterns instead of the contacts 14.

The register 45 is shifted in the usual way by position pulses derived from the line 21 shown in FIGURE 1.

Pulses on the line 21 are also applied to a binary counter 67 and to the shifting pulse line 48 of a second shifting register 49.

The register 49 also has sixteen stages 50 and each stage 50 is connected by means of sockets 51 and pluggable connections 52 to the common sockets 12 so that a pattern of arresting signals may be entered in the usual manner. The pattern selected for entry into the register 49 is that required for the area at the foot of a document. Thus, for example, an arresting signal is entered into the 8th stage 50 to mark the position on a document where totals are to be printed and signals in the 12th, 13th and 14th stages 50 control positioning of the sheet for printing a final address as in examples previously given. These signals correspond, as will be seen, to the 3rd, 4th, 5th and 9th line positions from the bottom of the document.

The special format signal is also entered into the 7th stage 50 to provide overflow control and its purpose will be described. The operation of the registers 45 and 49 for positioning a single document will first be described in order to explain the normal interaction of the registers.

It is assumed that the total length of a document is equivalent to sixty-four line positions. Since the register 45 has sixteen stages 47 it follows that the register 45 must be circulated four times for each document and arresting signals read out from the register 45 are required to be effective to control positioning of the document during one circulation only of each cycle of four circulations. Arresting signals read out from the register 49 are also required to be effective during one circulation only of each cycle, a different one however from that in which the signals from the register 45 are effective. It will be seen, however, that as in the previous example using a recirculating register, the signals in the registers occupy the same stages at the beginning of feeding of each document.

The signals read out from the registers 45 and 49 are rendered effective or inhibited under control of the binary counter 67 and a second counter 53 in the following way. The impulses on line 21 are, as previously described, applied to the counter 67 which has four binary counting stages and therefore produces an output signal on a line 54 after every sixteenth pulse. Thus, an output signal on the line 54 signifies that one complete circulation of registers 45 and 49 has taken place.

The output signals on line 54 are applied to the second counter 53 which has two binary stages and thus counts in scale-of-four. The counter 53 controls two gates 55 and 56, the gate 55 being adapted to pass a signal when the indicated count is one and the gate 56 being opened in a similar manner when the count is four. The signals passed by the gates 55 and 56 are applied to control gates 57 and 58 respectively. The arresting signal outputs from the registers 45 and 49 are applied over lines 59 and 60 to the gates 57 and 58 respectively and the outputs from the gates 57 and 58 are connected through two other gates 61 and 62 to the line 23 and hence to the amplifier 24 previously described with reference to FIGURE 1. The registers 45 and 49 are thus selectively read out to control positioning of the sheet on the first and fourth circulations respectively on each cycle. Hence, arresting signals from the register 45 are read out at the time when the first sixteen lines constituting the area at the head of the document is passing the datum line 6 (FIGURE 1) and the signals from register 49 are read out during the time when the last sixteen lines of the document, constituting the area at the foot of the document are passing the datum line 6.

Reading out of signals from the registers, however, is further controlled by the gates 61 and 62 (FIGURE 3) which are controlled by a format controller 63 associated with the apparatus controlling the printing mechanism. The gates 61 and 62 are arranged to control the selective passage of the pulses according to whether or not an overflow condition exists.

In the normal case where no overflow condition exists the format controller 63 maintains the gate 61 open and the gate 62 closed. Thus, the pattern of arresting signals associated with the area at the head of the document pass directly to the arresting signal amplifier 24.

When the area at the foot of the document is passing the datum position 6 (FIGURE 1) the signals from the register 49 (FIGURE 3) are read out through the gate 58. Since the gate 62 is closed, the first signal from the gate 58 is unable to pass to the amplifier 24. However, this first signal is the format signal which was entered as described into the seventh stage 50 of the register 49.

A connection 64 is provided from the output of the gate 58 to the format controller 63 and in consequence the format signal from the register 49 is applied over the connection 64 to the format controller 63 which operates to open the gate 62 and allow the remainder of the arresting signals from register 49 to pass to the amplifier 24 to control the positioning of the area at the foot of the document.

Under overflow conditions the first document is positioned for printing of the heading lines under control of the register 45 as described. Listing of items and automatic line spacing operations then follow throughout the second and third circulations of the registers 45 and 49. During the fourth circulation the gate 58 is opened as described and at the predetermined line position the format signal originally stored in the seventh stage 50 of register 49 passes through the gate 58 and over the connection 64 to the format controller 63 as described.

However, on this occasion, this signal occurs at a time when listing of items is still taking place. This condition is sensed by the format controller 63 in a known manner and the occurrence of a signal on the connection 64 under these conditions causes overflow operation of the format controller 63.

The operation of format controlling in apparatus of this kind do not form part of the present invention and in consequence a detailed description of the operation of the format controller 63 will not be given.

However, under overflow conditions the format controller 63 maintains the gate 62 closed and closes the gate 61. The format controller 63 also provides the necessary signals to the record card controlled accounting apparatus to initiate total taking and printing. After printing of totals the feeding of the document is automatically restarted.

The first document is now fed past the datum position 6 (FIGURE 1) and the second document is entered. During the passage of the area at the head of this document past the datum position 6 the gate 57 (FIGURE 3) is opened, as described, to allow signals from the register 45 to pass but the gate 61 is maintained closed. A connection 65 from the gate 57 is provided to allow these signals to pass to the format controller 63. The signals applied over line 65 are counted by the format controller 63 and the gate 61 is opened by the format controller 63 after four signals have been counted.

These four signals are those relating to the name, address and date heading positions of the document so that the document is not arrested at these positions. After the gate 61 has opened, the remaining signal from the register 45, representing the position of the first listed item line, is allowed to pass to the amplifier 24 to control the positioning of the sheet at this position. The format controller 63 also includes arrangements to cause re-printing of the totals in this position before the listing of items is resumed.

It will be seen that the arrangement of FIGURE 3 may be modified to allow re-entry of a pattern of arresting signals for every sheet by the appropriate connection of a detector, such as 35 (FIGURE 1) to the common sockets 12. This modification may be used for dealing with continuous stationery or for dealing with individual documents as previously described and the arrangement shown in FIGURE 3 may then be simplified. Since entry takes place for each document, the registers 45 and 49 have no recirculating loops.

Moreover if separate detectors are provided for the areas at the head and foot of the document, patterns may be entered into the registers 45 and 49 at the appropriate times in the cycle. Hence, the counters 67 and 53 are not required in this case and the gates 57 and 58 are omitted.

A further modification allows a single register to be used as described with reference to FIGURE 2. In this case, however, since only one output line from the register exists, only a single gate is controlled by the format controller 63 in place of the two gates 61 and 62. Only one input line to the format controller is provided from the output of the register, but since it is necessary to distinguish between patterns of signals appropriate to areas at the head and foot of a document, arrangements are made by means of a trigger circuit to cause signals arriving at the input of the format controller to take one of two paths, corresponding to the paths 64 and 65 respectively, in dependence upon whether the signals represent an area at the head or foot of the document. The trigger circuit is conveniently switched to one or the other of its two stages by signals derived from the lines 37 and 41 respectively of FIGURE 2.

In a further modification of the apparatus the format signals may be separated from the arresting signal pattern common to a number of kinds of documents. FIGURE 4 shows a modification to the apparatus of FIGURE 1 for this purpose.

A shifting register 70 is used to contain the common arresting signal pattern and this pattern may be entered into the stages of the register 70 by means of the sockets 10, the connections 11 and the sockets 12 in any of the ways previously described.

For the sake of uniformity the pattern entered as shown in the figure corresponds to the pattern used in the preceding examples. The pattern required for the head of the documents consists of arresting signals entered into the 6th, 7th, 8th, 10th and 12th stages from the right-hand end of the register. It will be appreciated that if the single line spacing for the body of the document is also to be derived from the register 70, then the 13th and succeeding stages will also have arresting signals entered therein, but for the sake of clarity, these stages will not be considered in the present description.

The pattern of arresting signals for the foot of the document requires the entry of signals into the 3rd, 4th, 5th and 9th stages from the left-hand end of the register as in the previous examples.

The signals required for controlling the format of the different kinds of documents are entered into a format register 71 and in the present case these format signals are entered in a similar way into the 11th stage from the right-hand end of the register 71 and the 10th stage from the left-hand end.

Both registers are shifted concurrently by the signals on the line 21, the arresting signals from register 70 being passed through an AND gate 72 to the line 23 and then to the amplifier 24 from which selected signals are passed to cause the document to be arrested as previously described. The format signals, on the other hand, are passed directly to the format controller 63 which in this case has a much simplified circuit including a bistable trigger circuit, the output of which is applied to control the AND gate 72.

The normal operation of the apparatus is such that the trigger is in its unset state and the AND gate 72 is maintained open so that a document is arrested in accordance with the arresting signal pattern in register 70.

If a continuation document is required however, the format signal from the 10th stage from the left-hand end of the register is read out at a time when listing of invoice items is still continuing. Under these conditions this format signal is applied to switch the trigger in the format controller 63 to its set state and the AND gate 72 is then closed. Consequently the arresting signals associated with the foot of the document are not passed to the amplifier 24. The switching of the trigger may also be used to provide a control signal to inhibit item listing and initiate the printing of a carried forward total at the position in which the document was arrested at the time when the format signal was read out. When the feeding of the document is resumed after printing of this total, since no further arresting signals are passed by the AND gate 72, the document will be fed completely out of the printer and a new document is inserted.

The AND gate 72 is still closed by virtue of the setting of the trigger in the format controller 63 with the result that the new document is fed past the normal arresting positions.

During this initial feeding the format signal from the 11th stage from the right hand end of register 71 is read out to the format controller 63. This signal is again applied to switch the trigger in the controller 63 so that the trigger is again unset and the AND gate 72 is opened.

Thus the arresting signal from the 12th stage from the right-hand end of register 71 is now passed to the ampifier 24 and the new document is arrested for printing on the first item line position. As before the switching of the trigger in the format controller 63 is used to initiate printing of the brought-forward total, after which item listing is resumed. It will be appreciated that the modification to the registers as shown with reference to FIGURE 2 may be used in conjunction with the example described above to enable the number of register stages to be reduced.

We claim:

1. Apparatus for printing lines of characters in predetermined positions on documents, including means for feeding a plurality of documents in succession past a datum position; means operable to print a line of characters at the datum position; a shifting register having a plurality of stages; means for determining at least two different patterns of arresting signals to be entered into predetermined stages of the shifting register, the signal patterns respectively corresponding to patterns of positions in different parts of the document which are required to be brought to rest at the datum position by arresting of the feeding means; means for indicating the part of the document approaching the datum position; means responsive to a document part indication to enter a selected one of said arresting signal patterns into the register; means for shifting out the contents of the shifting register in synchronism with the passage of the associated part of the document past the datum position; means responsive to the shifting out of an arresting signal to arrest the feeding means; means for operating the printing means after the arrest of the feeding means; and means for restarting the feeding means after a line of characters has been printed.

2. Apparatus for printing lines of characters in predetermined positions on documents, including means for feeding a plurality of documents in succession past a datum position; means operable to print a line of characters at the datum position; at least two recirculating shifting registers, each having a series of stages and a recirculation path connecting the final stage to the first stage of the register; means for determining arresting signal patterns to be entered respectively into the registers, the patterns to be entered into each of the different registers respectively corresponding to patterns of position on different parts of a document at which positions lines of characters are required to be printed; means for initially entering the patterns into the registers, each arresting signal of a pattern being entered into a predetermined one of the register stages; means for indicating the part of a document currently passing the datum position; means for circulating the contents of the registers through the respective recirculation paths in synchronism with the passage of a document past the datum position to re-enter the arresting signals into the register stages in which they were initially entered, a signal pattern completing at least two complete circulations during the passage of a single document past the datum positions; means for selecting a register from which arresting signals are to be read out in dependence upon the part of the document passing the datum position; means for reading out arresting signals circulated through the final stage of the selective register; means responsive to an arresting signal read out to arrest the feeding means; means for operating the printing means after the arresting of the feeding means; and means for restarting the feeding means after the printing of a line of characters.

3. Apparatus for printing lines of characters in predetermined positions on documents, including means for feeding a plurality of documents in succession past a datum position, said documents being of alternative kinds; means operable to print a line of characters at the datum posiiton; at least two shifting registers each having a series of stages; means for determining patterns of arresting signals and format signals to be entered into a register, the arresting signals in the patterns corresponding to positions on documents at which lines of characters are required to be printed; means for entering said patterns into predetermined stages of the shifting registers before the feeding of a document; means for shifting the contents of each register along the series of stages in synchronism with the passage of corresponding parts of a document past the datum position; means for reading out signals shifted into a predetermined stage of each register; format control means operable in dependence upon the kind of document currently being fed and responsive to the reading out of format signals to inhibit reading out of selected arresting signals; means responsive to an arresting signal read out to arrest the feeding means; means for operating the printing means after the arresting of the feeding means; and means for restarting the feeding means after the printing of a line of characters.

4. Apparatus as set forth in claim 3, in which the format signals and arresting signals, respectively, are entered into different shifting registers, the read-out means includes means for reading out signals from the format signal register directly to the format control means and means for gating signals from the predetermined stage of the arresting signal register; and in which the format control means is connected to control the gating means.

5. Document feeding and positioning apparatus, including means for feeding a plurality of documents successively past a datum position; at least one shifting register having a plurality of bistable stages initially all set to a first stable state; means for predetermining a pattern of arresting signals to be entered into predetermined stages of the register, said pattern of arresting signals corresponding to a pattern of positions on at least part of a documents at each of which positions a line of characters is required to be printed; means responsive to the approach of said part of a document towards the datum position to generate an entry control signal; pattern entry means responsive to said entry control signal to switch the predetermined register stages corresponding to the signal pattern to the second opposite stable state to represent arresting signals; means for shifting the contents of the register stage by stage in synchronism with the passage of said part of the document past the datum position; means for reading out the arresting signal representations from a further predetermined stage of the register; and means for temporarily arresting the feeding means in response to each of the arresting signals read out.

6. Document feeding and positioning apparatus, including means for feeding a plurality of documents successively past a datum position, each document having an area containing a plurality of positions which are required to be arrested at the datum position and carrying an indication of the presence of said area; a shifting register having a plurality of bistable stages all initially set to a first stable state; means for determining a pattern of arresting signals to be entered into predetermined stages of the register, said pattern of arresting signals corresponding to the pattern of arresting positions on the document area; means for sensing the area indications from documents being fed to produce an entry control signal; pattern entry means responsive to said entry control signal to switch the predetermined register stages corresponding to the signal pattern to the second opposite stable state to represent arresting signals; means for shifting the contents of the register stage by stage in synchronism with the passage of said part of the document past the datum position; means for reading out the arresting signal representations from a further predetermined stage of the register; and means for temporarily arresting the feeding means in response to each of the arresting signals read out.

7. Document feeding and positioning apparatus including means for feeding a plurality of documents successively past a datum position, each document having an area containing a plurality of positions which are required to be arrested at the datum position and carrying an indication of the presence of said area; a shifting register having a plurality of bistable stages all initially set to a first stable state; means for determining a pattern of arresting signals to be entered into predetermined stages of the register, said pattern of arresting signals corresponding to the pattern of arresting positions on the document area; means for sensing the area indications from documents being fed to produce an entry control signal; pattern entry means responsive to said entry control signal to switch the predetermined register stages corresponding to the signal pattern to the second opposite stable state to represent arresting signals; an electrical impulse generator synchronised to said feeding means for generating a train of shifting signals; means for applying the shifting signals to the register to shift the contents of the register stage by stage in synchronism with the passage of said part of the document past the datum position; means for reading out the arresting signal representations from a further predetermined stage of the register; and means for temporarily arresting the feeding means in response to each of the arresting signals read out.

8. Document feeding and positioning apparatus, including means for feeding a plurality of documents successively past the datum position, each document having an area containing a plurality of positions which are required to be arrested at a datum position and carrying an indication of the presence of said area; a shifting register having a plurality of bistable stages all initially set to a first stable state; pluggable connections to preselected stages of the register, the pattern of said preselected stages within the register corresponding to the pattern of arresting positions in the document area; an indication sensing device responsive to the passage of said indication carried by the document to produce an entry control signal; means for applying said entry control signal through said pluggable connections to switch said preselected register stages to the second opposite stable state to represent arresting signals; an electrical impulse generator synchronised to said feeding means for generating a train of shifting signals; means for applying the shifting signals to the register to shift the contents of the register stage by stage in synchronism with the passage of said part of the document past the datum position; means for reading out arresting signal representations from a predetermined stage of the register; and means for temporarily arresting the feeding means in response to each of the arresting signals read out.

9. Document feeding and positioning apparatus, including means to feed a document past a datum position, said document having a plurality of index positions which pass said datum position in turn; a shifting register having first, intermediate and final storage stages arranged in a chain, said stages each having first and second stable states; means to apply a pattern of control signals to preselected ones of the stages to switch said preselected stages simultaneously from the first state to the second state to store therein control items for controlling the feeding of the document, each item corresponding, respectively, to a preselected one of said index positions which is to be arrested adjacent the datum position; means for shifting the control items simultaneously along the chain of stages in synchronism with the feeding of said plurality of index positions past the datum position to cause said control items to be stored in turn in the final stage as the corresponding preselected index positions reach the datum position; means for reading-out the control items from the final stage; and means responsive to each control item read-out from the final stage to arrest the feeding of the document temporarily with said corresponding preselected index position adjacent the datum position.

10. Document feeding and positioning apparatus for use in a printing machine in which characters are printed in predetermined positions on a document, said apparatus including means to feed the document past a datum position; printing means operable to print at least one character on the document at the datum position; a shifting register having a first storage stage, at least one intermediate storage stage and a final storage stage, said stages being arranged in a chain and each having first and second stable states; means to apply a pattern of control signals to preselected ones of the stages to switch the preselected stages simultaneously from said first state to said second state to store therein control items for controlling the feeding of the document, each item corresponding, respectively, to one of said predetermined positions; means for shifting the control items simultaneously along the chain of stages in synchronism with the feeding of the document past the datum position so that said control items are stored in turn in the final stage as the corresponding predetermined positions on the document reach the datum position; means for reading-out the control items from the final stage; means responsive to each control item read-out from the final stage to arrest the feeding of the document temporarily with said corresponding predetermined position aligned with the datum position; and means to operate the printing means whilst the feeding is arrested.

11. Document feeding and positioning apparatus, including means to feed a plurality of documents successively past a datum position, each document having a group of index positions which pass the datum position in turn; a shifting register having first, intermediate and final storage stages arranged in succession, said stages each having first and second stable states; means to apply a pattern of control signals to preselected ones of the stages when said group of index positions on each document approaches the datum position, the control signals being effective to switch said preselected stages simultaneously from said first state to said second state to store therein control items for controlling the feeding of the document, each item corresponding, respectively, to a preselected one of said index positions which is to be arrested at the datum position; means to shift the control items simultaneously along the succession of stages in synchronism with the feeding of the index positions past the datum position to cause the control items to be stored in turn in the final stage as the corresponding preselected index positions reach the datum position; means for reading-out the control items from the final stage; and means responsive to each control item read-out from the final stage to arrest the feeding of the document temporarily with said corresponding preselected index position adjacent the datum position.

12. Document feeding and positioning apparatus, including means to feed a plurality of documents successively past a datum position, each document having a group of index positions which pass the datum position in turn; a shifting register having first, intermediate and final storage stages arranged in succession, said stages each having first and second stable states; means to apply a pattern of control signals to preselected ones of the stages to switch said preselected stages from said first state to said second state to store therein a pattern of control items for controlling the feeding of the documents, each item corresponding, respectively, to a preselected one of said index positions which is to be arrested adjacent the datum position; means to shift the control items simultaneously along the succession of stages in synchronism with the feeding of the index positions of a document past the datum position to cause the control items to be stored in turn in the final stage as the corresponding preselected index positions of said document reach the datum position; means for reading-out the control items from the final stage; means responsive to each control item read-out from the final stage ot arrest the feeding of the document temporarily with said corresponding preselected index position adjacent the datum position; and a recirculating path connecting said final stage to said first stage to re-enter the pattern of control items into the register stages in readiness for the feeding of the next document.

13. Document feeding and positioning apparatus for use in a printing machine in which characters are printed in predetermined positions on documents, said apparatus including means to feed a plurality of the documents successively past a datum position; printing means operable to print at least one character on each document at the datum position; a shifting register having a first storage stage, at least one intermediate storage stage and a final storage stage, said stages being arranged in a chain and each having first and second stable states; means to apply a pattern of control signals to preselected ones of the stages to switch the preselected stages simultaneously from said first state to said second state to store therein a pattern of conrol items for controlling the feeding of the documents, each item corresponding, respectively, to one of the predetermined positions of the first document of said plurality fed past the datum position; means to shift the control items simultaneously along the chain of stages in synchronism with the feeding of the documents past the datum position to cause said control items to be stored in turn in the final stage as the corresponding predetermined positions reach the datum position; means for reading-out the control items from the final stage; means responsive to each control item read-out from the final stage to arrest the document feeding temporarily with said corresponding predetermined position aligned with the datum position; means to operate the printing means whilst the feeding is arrested; and a recirculating path connecting said final stage to said first stage to re-enter the pattern of control items continuously into the register stages in readiness for the feeding of successive documents.

14. Document feeding and positioning apparatus, including means to feed a document past a datum position, said document having first and second groups of index positions which pass the datum position in succession; first and second shifting registers each having first, intermediate and final storage stages arranged in a chain, said stages each having first and second stable states; means to apply control signals to preselected stages of the registers to switch said preselected stages simultaneously from said first state to said second state to store control items therein for controlling the feeding of the document, the control items stored in the first register each corresponding, respectively, to a preselected index position of the first group, and the control items stored in the second register each corresponding, respectively, to a preselected index position of the second group, which preselected index positions are to be arrested at the datum position; means to shift the control items simultaneously through the registers in synchronism with the feeding of the index positions past the datum position; means to read-out the control items from the final stage of the first register as the corresponding preselected index positions of the first group reach the datum position; means to read-out the control items from the final stage of the second register as the corresponding preselected index positions of the second group reach the datum position; and arresting means responsive to each control item read-out from said final stages to arrest temporarily the feeding of the document.

References Cited in the file of this patent

UNITED STATES PATENTS

| | | |
|---|---|---|
| 2,638,542 | Fleming | May 12, 1953 |
| 2,708,267 | Weidenhammer | May 10, 1955 |
| 2,776,618 | Hartley | Jan. 8, 1957 |
| 2,799,222 | Goldberg | July 16, 1957 |
| 2,800,073 | Block | July 23, 1957 |
| 2,831,561 | Speh | Apr. 22, 1958 |
| 2,873,666 | Stiefel | Feb. 17, 1959 |
| 2,988,194 | D'Onofrio | June 13, 1961 |